United States Patent [19]

Kohaut

[11] 4,341,919
[45] Jul. 27, 1982

[54] INSERT DEVICE

[76] Inventor: John E. Kohaut, 10 Hepworth Pl., West Orange, N.J. 07052

[21] Appl. No.: 227,755

[22] Filed: Jan. 23, 1981

[51] Int. Cl.³ .............................................. H02G 3/28
[52] U.S. Cl. ....................................... 174/48; 52/221
[58] Field of Search ...................... 174/48, 49; 52/220, 52/221

[56] References Cited

U.S. PATENT DOCUMENTS 3,903,666  9/1975  Fork .................................. 174/49 X Primary Examiner—B. A. Reynolds
Assistant Examiner—David A. Tone
Attorney, Agent, or Firm—Howard N. Sommers

[57] ABSTRACT

A novel conduit device including oppositely opening conduit sections of triangular outline, formed complementarily with and engaging and grommeting axially offset apertures in the side walls of parallel raceways, for separate passage through the raceways and the conduit device of elongated different purpose and forms of devices, such as telephone and power cables and wires, avoiding danger of crossing such wires, and assuring their passage in safety through the device and to the related apparatus.

27 Claims, 14 Drawing Figures

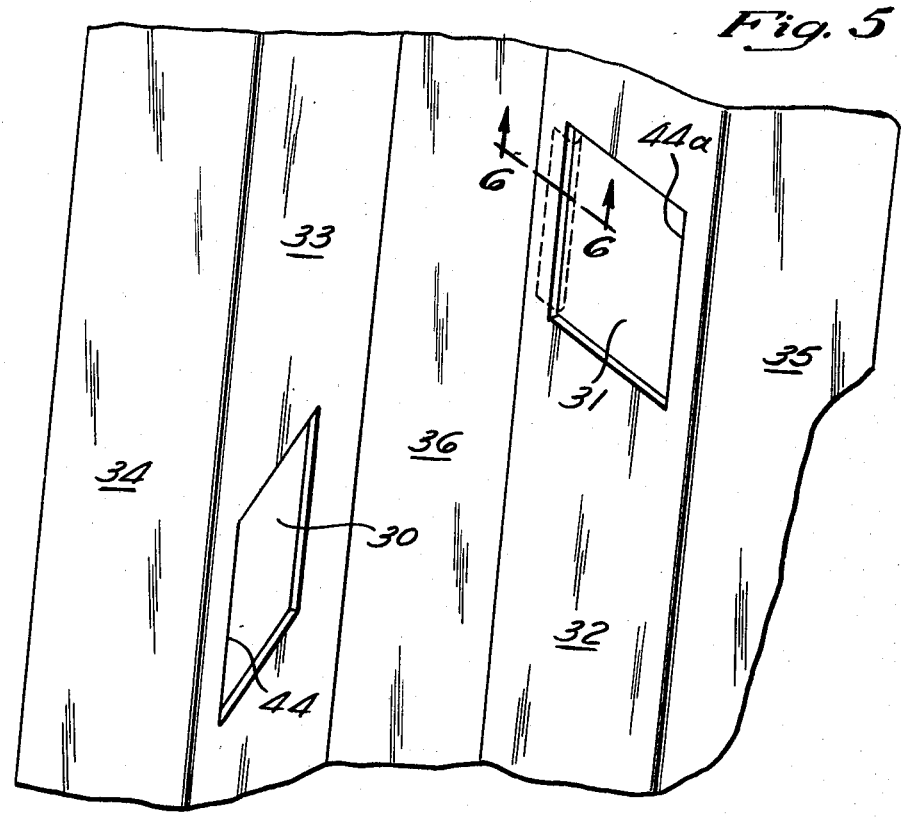
Fig. 5
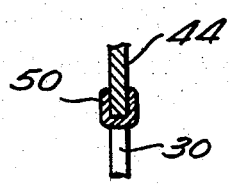
Fig. 6
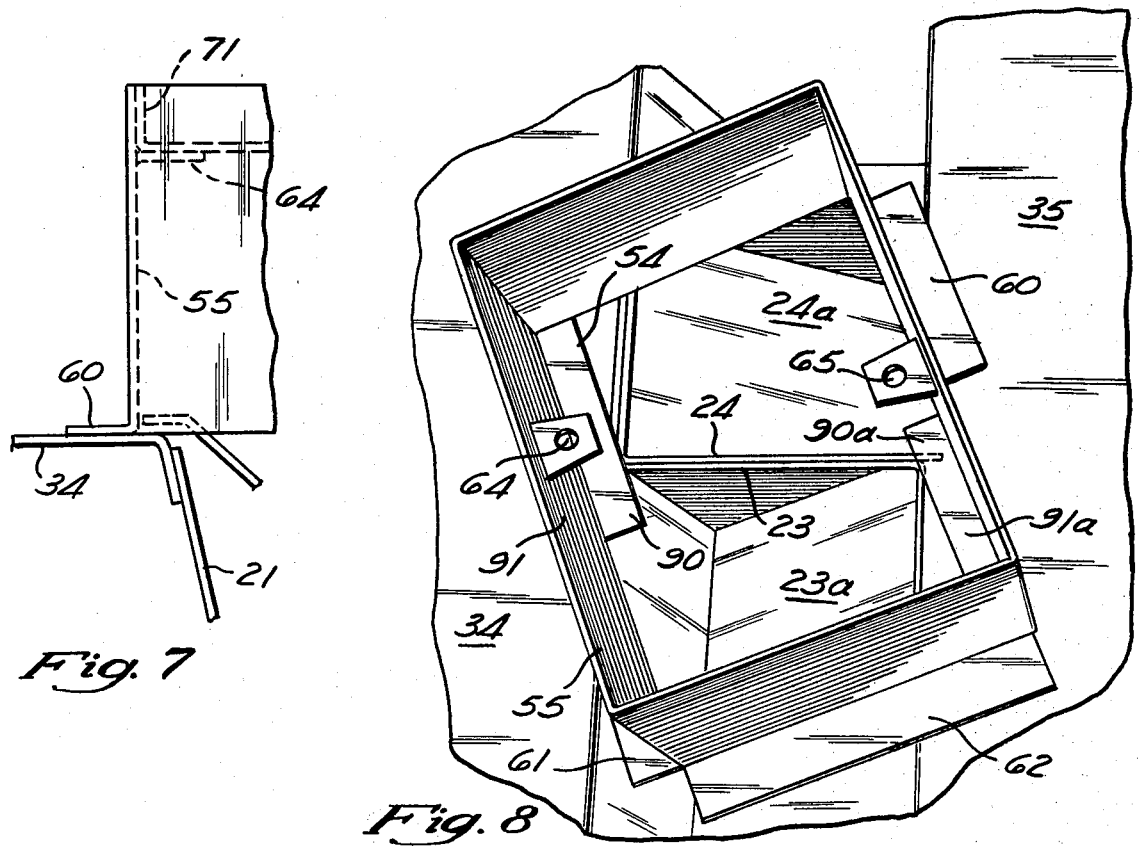
Fig. 7
Fig. 8

Fig. 9
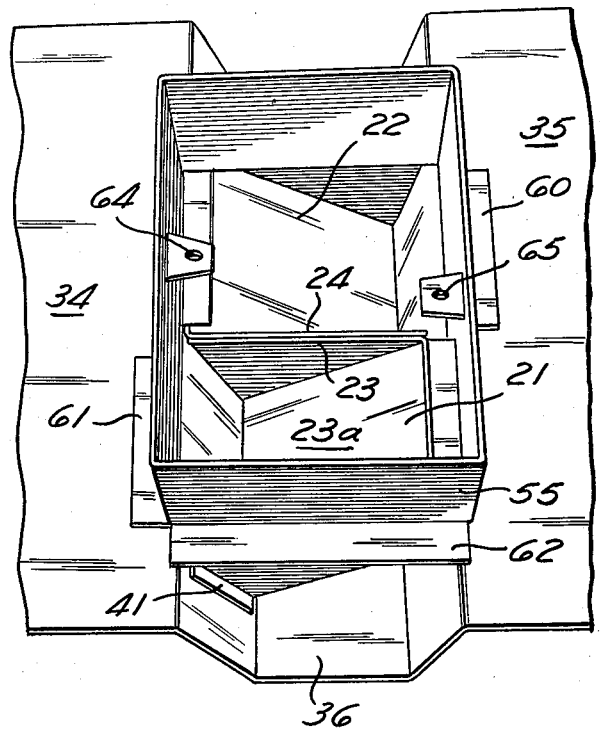
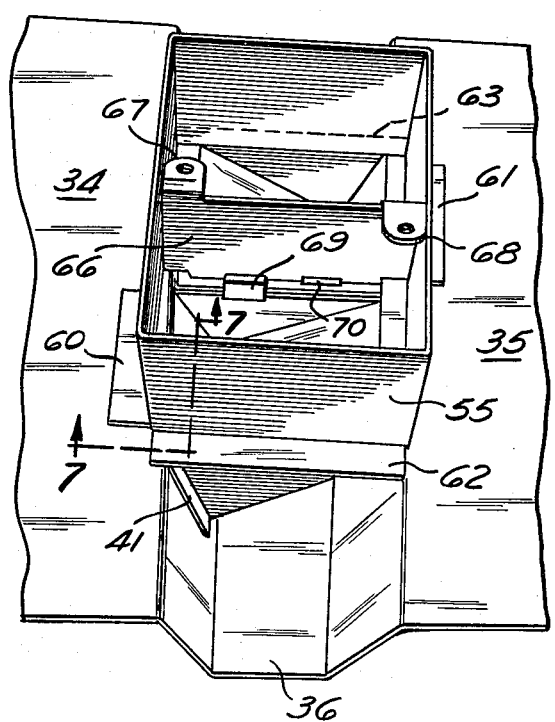
Fig. 10
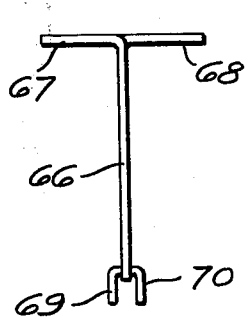
Fig. 11

INSERT DEVICE

PRIOR ART DEVICES

Various forms of conduit devices in use have necessitated the use of special tools and dexterity for installation and use of the devices. Necessity for special instructions and training of installation personnel added to the cost of installation, often resulted in errors of installation and in damage to the wires and conduit devices and incomplete and defective installation, necessitating costly repairs and replacement and creating serious fire and other hazards pending discovery of the deficiencies and correction or replacement.

THE DEVICE OF THE INVENTION AND USE THEREOF

The device of the invention overcomes the above noted and other deficiencies in prior art devices through original and novel structural features. Elongated members, such as telephone and power wires and cables and the like, passed through the device of the invention, are automatically and permanently separated and maintained apart therein and therethrough. The device enables rapid, accurate and safe assembly and complementary installation with the raceways, without necessitating the use of special tools or special dexterity, while achieving accurate registration and interlocking of the parts. Such raceways may (FIGS. 4 and 5) be formed of a plurality of parallel, downwardly opening cell members connected in spaced relation at their lower ends, with the walls of adjacent members preferably upwardly, outwardly inclined, defining parallel intermediate valleys wherein the insert device of the invention may be positioned. The wires or cables may be separately and readily passed from suitable sources through axially offset apertures in the side walls of the raceways and through the novel conduit units of the invention engaged therewith and to the apparatus to be connected therewith and energized or otherwise related thereto.

The insert device of the invention becomes essentially part of the building structure, being assembled and positioned without use of special tools or requirement of special dexterity. The sectional chute members of the device, are assembled in oppositely opening directions into interlocking registry with the cable raceways cell openings. The cellular raceways are walled channels which, in turn, are mounted in or attached to the floor, beam or other building structure and telephone and power wires are automatically separated therein and therethrough.

DESCRIPTION OF THE DRAWINGS

In the drawings, exemplifying preferred forms of the invention, and wherein like parts are indicated by like reference characters:

FIG. 5 is a fragmentary, partly broken, perspective view of adjacent raceways provided with axially offset apertures in the side walls thereof, to be engaged by the cable conduit units in interlocking registration therewith, FIG. 6 is a fragmentary, sectional view, taken at line 6—6 of FIG. 5, schematically showing the grommeted upper horizontal portion of the apertures portion in the side wall of such raceway, FIG. 7 is a fragmentary elevational view of a corner of a body member, which may be used in connection with the invention, of rectangular form, each of the four corners thereof being similarly formed, FIG. 8 is a top plan view of an insert cable body member shown in position just prior to rotation into interlocking snap-fitting registry with flanges 51, 51a at upper portions of the cable conduit sections, FIG. 9 is a view similar to FIG. 8, but showing the cable body member rotated, registering its lower interior flanges into interlocking snap-fitting engagement with said flanged 51, 51a upper portions of the cable conduit members, FIG. 10 is a similar view, also showing partition or baffle means positioned in the body member to define separate passageways therethrough for different types or functions (for example telephone and power) cables and wires, FIG. 11 is an end elevational view of a form of partition or barrier member 66, also shown in FIG. 10.

PREFERRED FORMS OF THE INVENTION

Figure 1:
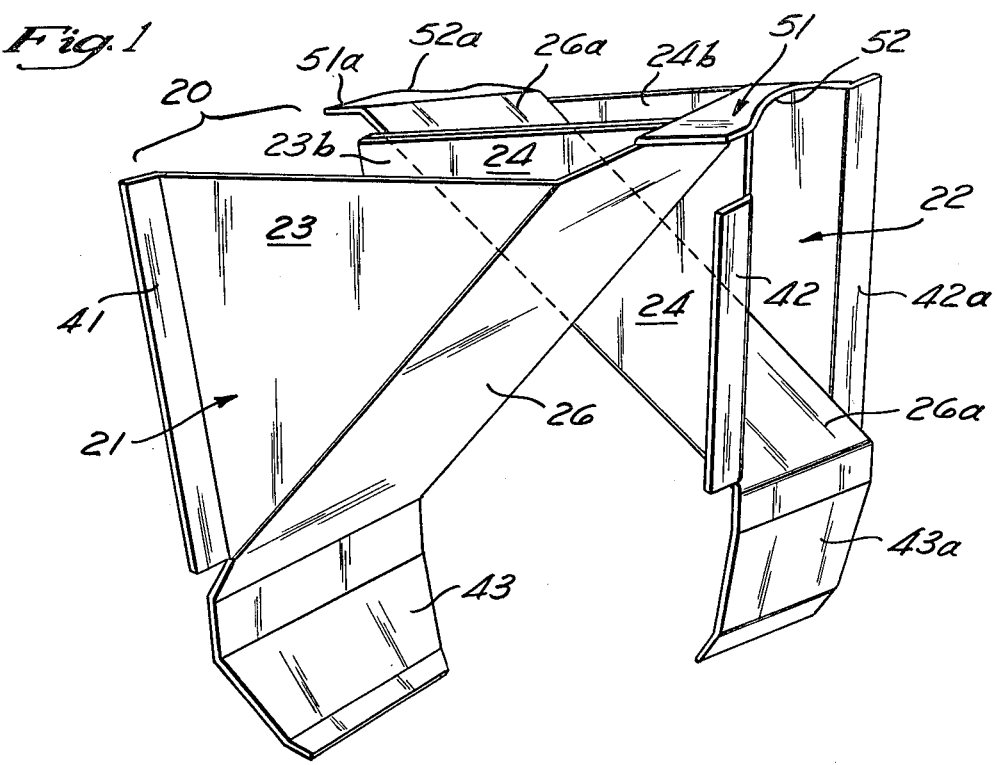
FIG. 1 is a perspective view of a pair of pivotally connected cable conduit sections defining the conduit units embodying the invention.
Figure 2:
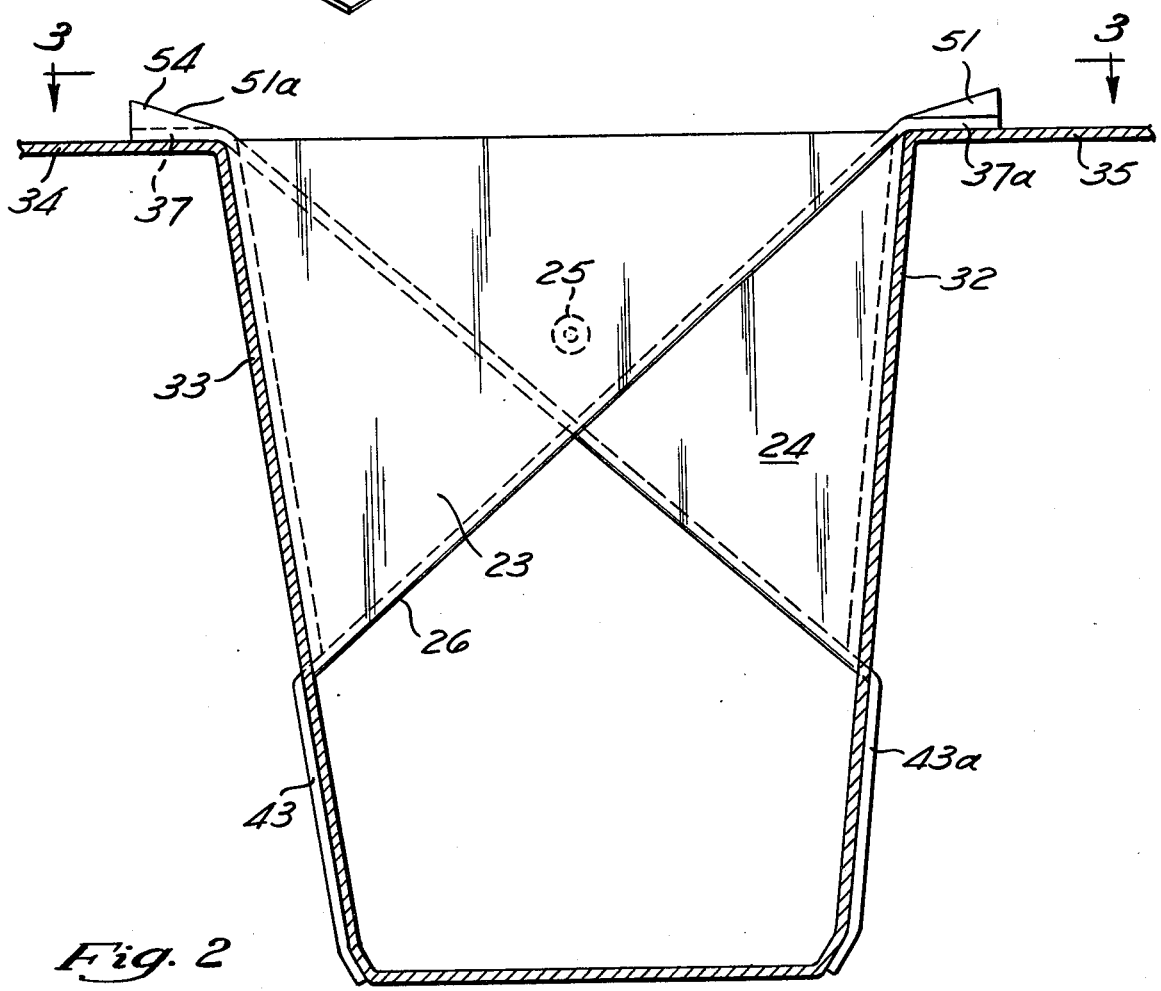
FIG. 2 is a vertical elevational, partly sectional view thereof taken at line 2—2 of FIG. 3, showing the conduit unit in interlocked position with the axially offset openings in the walls or side portions of the cellular cable raceways.
Figure 3:
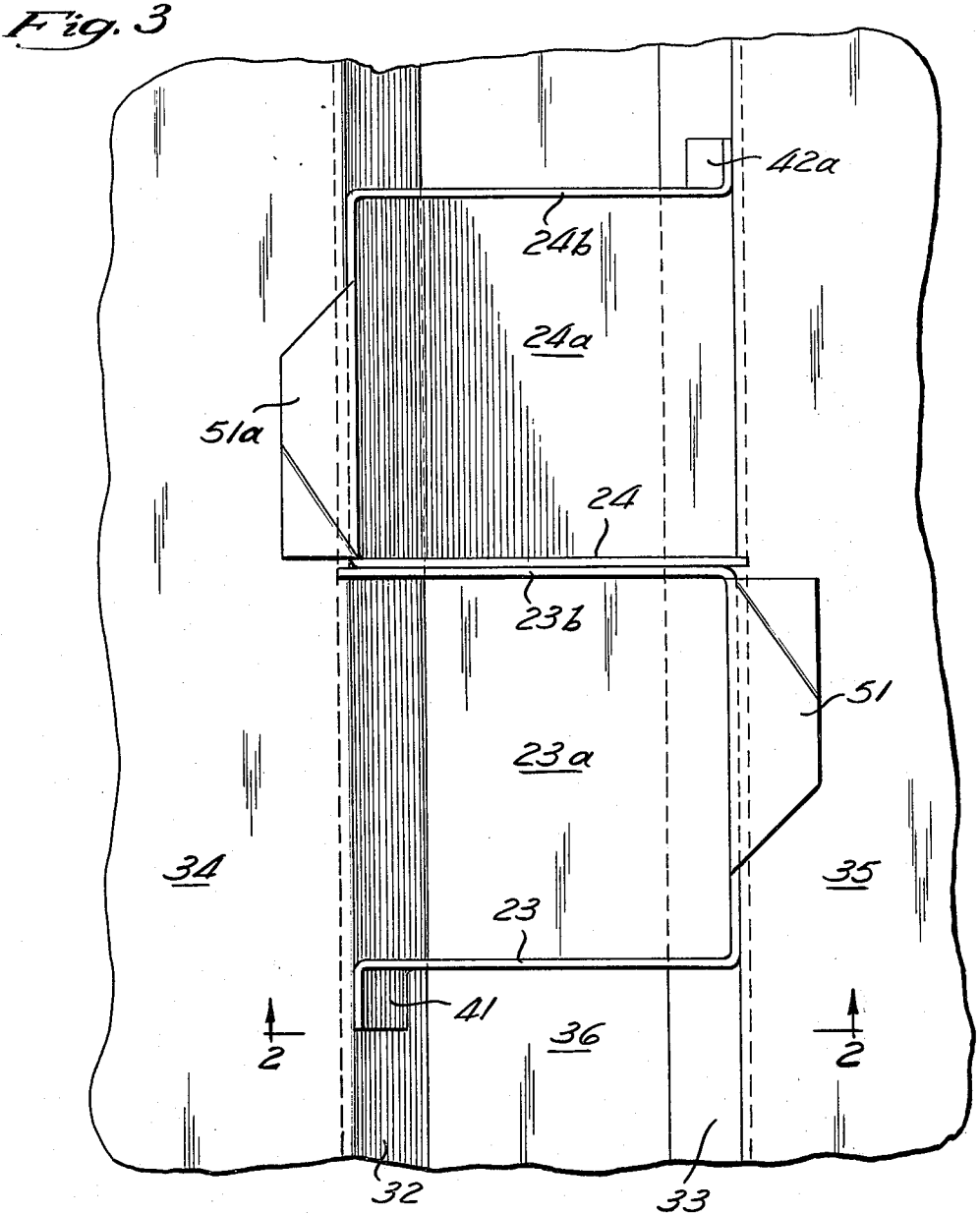
FIG. 3 is a top plan view thereof, taken at line 3—3 of FIG. 2.
Figure 4:
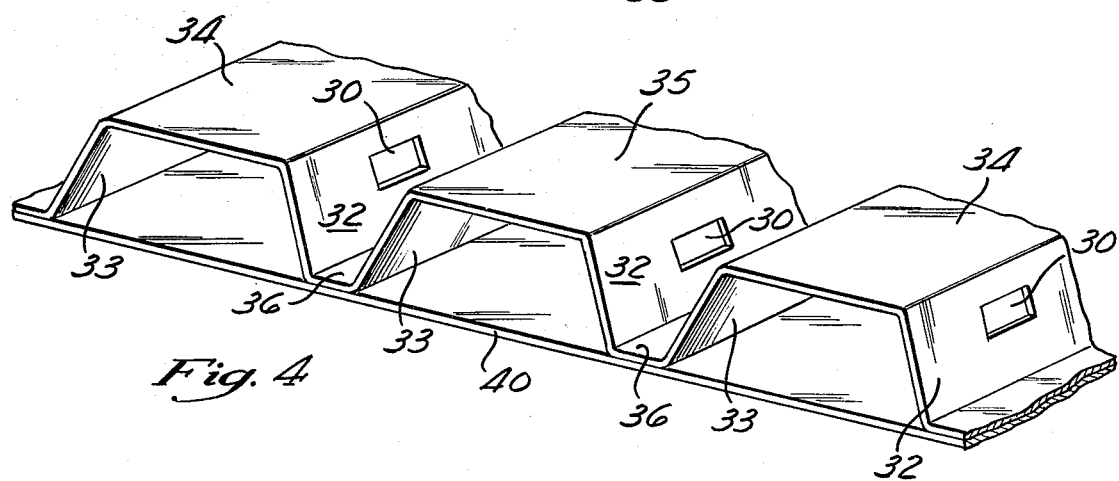
FIG. 4 is a reduced scale, schematic, perspective view of three adjacent raceway cells with which the units of the invention may be interlocked.

The drawings illustrate preferred forms of the invention, comprising (FIGS. 1–3) an insert conduit unit device 20 having a pair of sections 21, 22 having inner side walls 23, 24 (FIGS. 3, 8, 9). The sections 21, 22 are assembled in oppositely opening, contiguous relation, and rotatably so connected by means such as rivet member 25 (FIG. 2) passing through and connecting the inner side walls 23, 24 rotatably and contiguously. It will be noted that the conduit unit thus comprises chute sections 23a, 24a (FIGS. 3, 8, and 9) rotatably connected and opening outwardly in opposite directions for insertion, in use, into the axially spaced and non aligned, or offset, apertures 30, 31, (FIG. 5) in the side walls 32, 33 of the raceway cells. As used herein "raceway" shall be deemed to include all wire and cable sources with which devices of the invention may be used. The side walls depend from the raceway top walls 34, 35 (FIGS. 4, 5) with connecting valleys 36 therebetween, as shown in FIG. 4, which is a fragmentary, reduced scale, perspective view of raceway cells. Said cells are axially elongated and define parallel spaced passageways therein for passage therethrough of elongated members, for example, telephone wires and power cables, in offset separate relation through the apertures of the oppositely facing raceway cell walls.

The raceway cells (as in original building construction) are secured to a form member 40 (FIG. 4) as by nails, welding or other means, for forming the floor member, as by pouring cement onto member 40.

The openings (30, 31, FIG. 5) in the side walls of the raceway are not formed directly opposite each other, as is conventional, but are formed pursuant to the invention in axially staggered or offset relation and the lower end tabs or flanges 43, 43a of the conduit sections 21, 22 are (FIGS. 2, 1, 3) inserted into the axially offset openings 30, 31, (FIGS. 5, 4) in the raceway cells.

When the raceway apertures are rectangular (FIG. 5) the side flanges 41, 41a, 42, 42a of the conduit sections (FIGS. 1, 3, 9) grommet two sides of the axially offset raceway openings 30, 31, on positioning the conduit unit sections flanges 43, 43a into said raceway openings. Flanges 43, 43a depend from the rear walls 26, 26a (FIG. 1) which connect the side walls of the conduit sections in spaced parallel relation, and are insertable into the apertures portions 30, 31 of the raceway side walls. Each section has a pair of side wall members 23, 23b, 24, 24b, (FIG. 1) and an end wall member 26, 26a, connecting the side wall members in spaced parallel relation and defining the bottom (and one closed end) of said section.

By moving the upper ends of the conduit sections in an icetongs sort of action, the lower ends of flanges 43, 43a will (FIG. 2) follow the contour of and press against the inner faces of lower horizontal portions of the raceway side walls apertures, grommeting them. The fourth sides of said apertures (their top horizontal sides 44, 44a, FIG. 5) may be readily grommeted by any means, such as (FIG. 6) positioning a length of channelled grommet strip member 50 over said horizontal sides 44, 44a. It will be understood that the contours of the raceway apertures 30, 31, may be varied within the spirit and scope of the invention.

Each conduit section (21, 22) preferably (FIG. 1) defines a channel open at the top and front for passage of the elongated members through the raceways, as above described, and into and through the conduit sections 21, 22 for continued separation of the wires and cables received from and through adjacent raceway apertures.

As recited above, the conduit unit insert device 20 of the invention may be readily inserted into the raceway apertures without the use of tools or special dexterity; the bottom flanges, on such insertion, follow the inner contours of the side walls of the raceway cells and, upon moving the upper ends of sections 21, 22 together, the side flanges 41, 41a, 42, 42a of the conduit sections registering with and overlying and grommeting the (FIG. 3) apertured portions of the raceway cells.

The conduit sections 21, 22 are further provided with upper flanges or lip portions 51, 51a (FIGS. 2, 3) adapted to register in overlapping relation with the top walls 34, 35 of the raceway cells upon registration-insertion of the conduit unit device into adjacent raceway cells apertures. The upper flanges or lip portions 51, 51a are preferably offset as at 52, 52a (FIG. 2) to provide recessed spaces 37, 37a to receive interlocking tabs 54, 54a (FIG. 8) formed at the diagonally opposite portions of the bottom of the casing body member 55. In the original construction of a building, the conduit units 21 of the invention may be assembled to the raceway sections 32, 33 and the casing body member 55 assembled to the conduit units 21 without the use of tools, jigs, or fixtures, in the novel fashion described herein, assuring accurate assembly and locking registration of the parts. The casing body member 55 may be positioned atop the conduit unit and raceway sections and connected by the installer's rotating the same from the FIG. 8 to FIG. 9 position (much as one would rotate and apply a jar cap). On such rotation of the casing body member, (FIG. 8–FIG. 9) interlocking ends of tabs 90, 90a (FIG. 8) of the casing body member 55 enter beneath the lip portions 51, 51a of the casing body members (FIG. 1), entry being further facilitated by the offset portions 52, 52a formed in said lip portions defining said recesses or spaces 37, 37a (FIG. 2) thus defined under the lip portions 51, 51a in the top wall portions 34, 35 of the raceway cells. The corners 90, 90a (FIG. 8) of the tabs 54 of casing body member 55 first enter the spaces 37 (FIG. 2) on the above described rotation of casing 55, facilitating the completion of (FIG. 8–FIG. 9) rotation thereof and interlocking the parts firmly.

The casing body member 55 (FIGS. 8, 9) is further provided with outwardly directed side flanges 60, 61 on the bottom thereof which, on assembly of the body member onto the conduit unit, abut the top walls 34, 35 of the downwardly opening, channelled raceway cells, and with outwardly extending end flanges 62, 63 at the bottom thereof which (FIGS. 8–10) abut the top walls 34, 35 of the raceway cells, registering the parts.

The casing body member 55 is further provided with tabs having tolerance clearance holes 64, 65 (FIGS. 8 and 9) to which a barrier or divider member 66 (FIGS. 10, 11) may be secured as by providing said barrier or divider with threaded end ears 67, 68 complementary to and adapted to be positioned beneath the apertured studs 64, 65 and secured thereto by any suitable means, as by bolts, rivets or the like passed through the tolerance clearance holes 64, 65 and threadedly engaging the threaded ears 67, 68. The lower end of the divider 66 is (FIG. 11) provided with offset cupshaped projections 69, 70 which (FIG. 10) telescopically engage contiguous inner walls 23, 24 of the insert conduit sections, 21, 22 forming essentially a continued baffle extension therewith, maintaining separation of the wires and cables into and through the conduit sections and casing body member 55 and to apparatus to be connected therewith.

Figure 12:
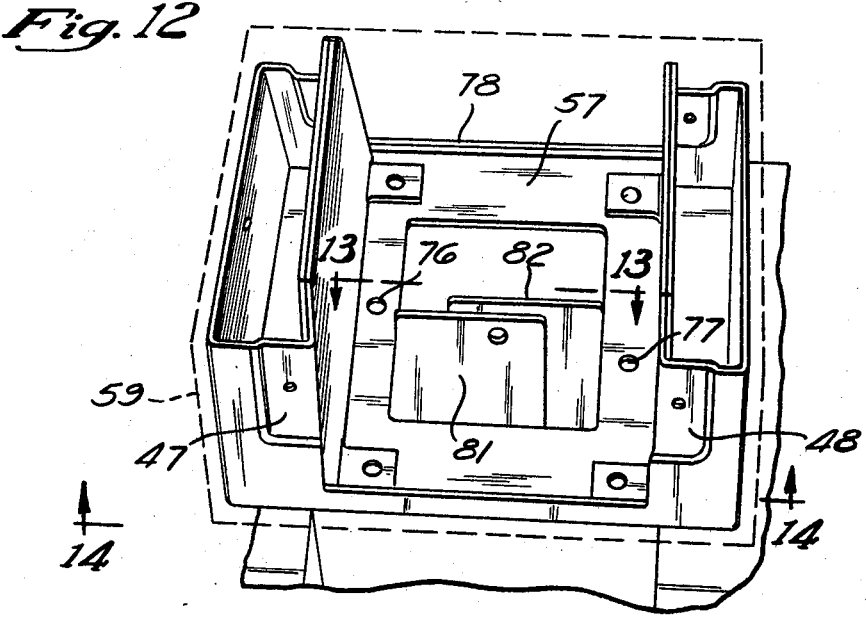
FIG. 12 is a partly fragmentary, perspective view of a top fixture member which may be secured to the body member.

In the cement pouring operation (onto form member 40, etc. FIG. 4) casing body member 55 and the conduit sections 21, 22 would be sealed onto the raceways. On completion of the cement pouring and setting operations, when it is desired to activate units of the invention, the body cap member 71 (FIG. 7) may be removed from the casing body member 55 and entry thereby enabled to the interior of the apparatus located at the floor level as through a floor fixture 57 (FIG. 12). The cap or cover member 71 (FIG. 7) for the body member 55 may be of any desired form such as an open pan type, in which case, on pouring the cement and setting, some cement would also be in the pan, from which it would be chipped and the cover 71 removed. Or the cover member may be a downwardly-opening, hatshaped cover, suitably connected to the body member, obviating the need for chipping cement away; such cover could, after setting of the cement, then be lifted from the casing body member top, opening the latter. Any of an infinite variety of cover members, such as are well known to those skilled in the art, may be used in connection with the invention.

Figure 13:
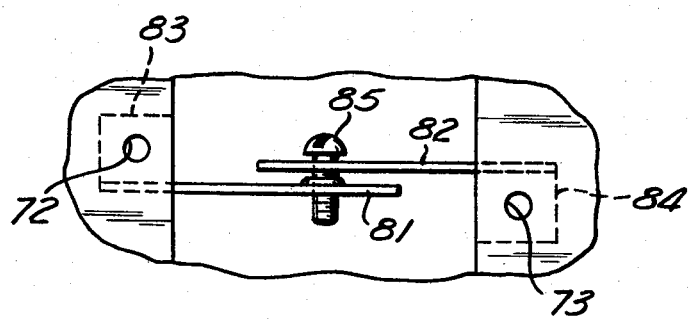
FIG. 13 is a fragmentary top plan view, taken at line 13—13 of FIG. 12.

In FIG. 12 a fixture 78 is shown which may be positioned on the casing body member 55 and secured thereto by any suitable means. The fixture 78 may include barrier plates 81, 82 (FIG. 13) forming a continued divider into and through the fixture, maintaining separation of the wires and cables passing upwardly into the fixture from the casing body and raceways and through the fixture (FIG. 12) and to the apparatus to be served thereby. Barrier plates 81, 82 may be secured medially by bolt 85 and may have side tabs 83, 84, provided with threaded openings 72, 73 to receive bolts or other means passing through clearance apertures 76, 77 in the fixture.

Figure 14:
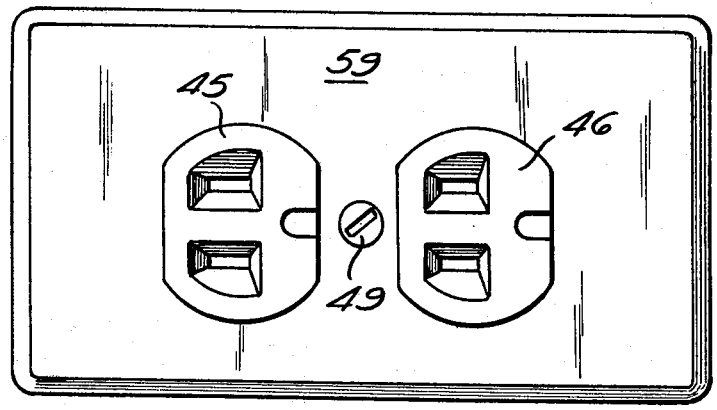
FIG. 14 is an end elevational view of a plate member 59, disposed, in use at the nearest end of the top fixture member as viewed in FIG. 12.

A mounting metal or other plate 59 (FIG. 14) may be secured to a bracket (of forms well-known in this art) having outlet sockets 45, 46 mounted thereon for connection of plugs of electric power or other cables thereto. The bracket may be secured to portions, such as 47, 48, of fixture 78, by suitable means. Plate 59 may be secured to such bracket as by bolt means 49 (FIG. 14); the so separated cables, wires etc. for telephone, power, transmission and service may pass through opposite sides of the fixture so separated by the barrier plates 81, 82. The form of fixture 78 may be varied to serve the variety of uses to which the invention may be put, the invention being not limited to the form exemplarily shown in the drawings. Cover plate 59 (FIG. 12) may be of any of the infinite varieties available in the art and may be positioned over top, sides and rear of the fixture and registered with the metal plate 59 at the front thereof.

It will be understood that the fixture 78 shown is exemplary of an infinite variety which may be used in connection with the invention, which is to be deemed not limited thereto, and that the invention may be used in single or multiple form in connection with any apparatus or fixture, and positioned on a modular spaced basis or at other calculated floor stations in multiple form, on a floor plan showing such locations, or may be applied after setting of floor cement wherein it is to be positioned.

Preferred embodiments of the invention have been set forth herein; it is to be understood that variations may be made in such preferred embodiments; such variations, within the scope of the claims, shall be deemed within purview of and covered by the invention and the claims herein thereon.

I claim:

1. An insert conduit unit for use in connection with raceway members, whereby elongated members may be passed through said raceway members and said insert conduit unit and connected to apparatus, said insert conduit unit comprising:
   (a) a pair of insert conduit sections,
   (b) each section having a pair of side wall members and an end wall member connecting the side wall members in spaced parallel relation and defining the bottom and one end of said section,
   (c) each section being open at the other end thereof, and
   (d) means connecting said sections contiguously, with their open ends in oppositely opening position, thereby aligning said oppositely disposed open ends thereof for passage of said elongated members therethrough and through said insert conduit unit, for connection to said apparatus, said means further so connecting said sections relatively rotatably.

2. In an insert conduit unit for use in connection with raceway members, as set forth in claim 1, said means so connecting said sections comprising means passing through the side walls of the so positioned oppositely opening sections and relatively rotatably so connecting them adjacently.

3. In an insert conduit unit for use in connection with raceway members, as set forth in claim 1, means on each said conduit section for registering with and engaging the raceway members, to so connect said sections therewith.

4. In an insert conduit unit for use in connection with raceway members, as set forth in claim 1, in which the raceways have openings therein, and the unit further comprises means extending from the open ends of said sections for inserting into the cable raceway openings, to thereby engage the raceway members and connect said conduit sections therewith.

5. In an insert conduit unit for use in connection with raceway members, as set forth in claim 1, in which the raceways have openings therein, and the unit further comprises flanges on said sections for complementary interfitting with the raceway openings and grommeting the same.

6. In an insert conduit unit for use in connection with raceway members, as set forth in claim 1, in which the raceway members have openings therein, and the unit further comprises bottom flanges on the section members for complementary interfitting with the apertured portion of the raceway member and engaging and grommeting the same.

7. In an insert conduit unit for use in connection with raceway members, as set forth in claim 1, angularly disposed marginal side flanges on the said side wall sections for complementary interfitting with the openings in the raceway and grommeting the same.

8. In an insert conduit unit for use in connection with raceway members, as set forth in claim 1, said means so connecting said sections comprising means passing through apertured portions provided in side walls of said sections and relatively rotatably connecting them.

9. In an insert conduit unit for use in connection with raceway members as set forth in claim 1, in which the raceways have rectangular apertures, and the unit further comprises flanges extending from the bottom and side portions of the conduit section walls for complementary interfitting with the raceway apertures and grommeting the same.

10. In an insert conduit unit for use in connection with raceway members as set forth in claim 1, in which the raceways have an aperture, and the unit further comprises flanges extending from the conduit section walls for complementary interfitting with portions of the raceway aperture and grommeting the same, and
means for engaging the remainder of said raceway aperture and grommeting the same.

11. In an insert conduit unit for use in connection with raceway members as set forth in claim 1, in which the raceway members have openings therein, and the unit further comprises top flanges extending from the end wall of the section for complementary interfitting with and overlying of the raceway member on registration of the unit section therewith.

12. In an insert conduit unit for use in connection with raceway members, in which each raceway member comprises a pair of axially elongated side wall members, said side wall members being connected in parallel, spaced relation, whereby elongated members may be positioned from a source thereof, into and through said raceway members, for connection to apparatus, oppositely disposed and axially offset apertured portions provided in each of said side wall members, said unit comprising:

a pair of sections, each having side walls and a bottom wall connecting said side walls in parallel spaced relation and defining therewith a U-shaped tapered channel section open at the top and front thereof, said sections being rotatably connected together and proportioned for complementary registration with said raceway openings, whereby, on registering the unit with said raceway apertures, elongated members may be passed through said apertured portions of the raceway and through said insert conduit unit and connected to apparatus.

13. In an insert conduit unit for use in connection with raceway members as set forth in claim 12, flanges angularly extending from the side and bottom of each conduit section for complementary grommeting registration with the aperture in the raceway member.

14. In an insert conduit unit for use in connection with a raceway member, as set forth in claim 12, means on each section for complementary interfitting with an apertured portion of said raceway member and insertable thereinto, and grommeting the same and means connecting said sections relatively rotatably.

15. In an insert conduit unit for use in connection with a raceway member, as set forth in claim 12, in which the raceways have top portions so connecting the side walls thereof, and the unit further comprises flanges on said sections for overlying the top portions of the raceway member on registering the unit with the raceway member.

16. In an insert conduit unit for use in connection with a raceway member, as set forth in claim 12, in which the raceways include top portions so connecting the side walls thereof, and the unit further comprises flanges on said sections for overlying the raceway member top portions, and an open body casing with flanges at the bottom thereof proportioned for insertion between the flanges on the sections and the top portions of the raceway members, to so register and connect the body casing and raceway.

17. In an insert conduit unit for use in connection with a raceway member, as set forth in claim 12, in which the raceways include top portions so connecting said side walls of said raceways, and the unit further comprises flanges on said sections for overlying the top portions of the raceway member, with a space therebetween on so registering the unit with the raceway member, an open body casing with flanges at the bottom thereof proportioned to enter said space, and flanges extending outwardly of the body casing and proportioned to contact and register with the top portions of the raceway.

18. In an insert conduit unit for use in connection with a raceway member, as set forth in claim 12, in which said raceways have top portions so connecting said side walls, and the unit further comprises flanges on said sections overlying the top portions of the raceway member on so registering the unit with the raceway member, with a space therebetween, a body casing, and flanges extending inwardly of the bottom of the body casing proportioned to enter said space on registering the body casing with the top portions of the raceway.

19. In an insert conduit unit for use in connection with a raceway member, as set forth in claim 12, means connecting said sections contiguously with their open ends disposed in oppositely opening positions, for passage of said elongated members therethrough for connection to said apparatus, a body member connected to said sections, and barrier means secured to the body member and depending therebelow in alignment with the sections and defining separation means for members entering the body member from sections.

20. In an insert conduit unit for use in connection with a raceway member, as set forth in claim 12, means connecting said sections contiguous with the open ends thereof in oppositely opening positions, thereby aligning said opposite open ends for passage of said elongated members therethrough and through said insert conduit unit for connection to said apparatus, flanges on said sections overlying the raceway member on so registering the unit with the raceway member, with a space therebetween, an open body casing, and flanges at the bottom of the body casing proportioned for insertion between the flanges on the conduit sections and the top portions of the raceway member, on positioning the body casing on the top portions of the raceway and twisting the body casing to enter said flanges into said spaces.

21. An insert conduit unit for use in connection with raceway members having openings therein, whereby elongated members may be passed through said raceway member and insert conduit unit and connected to apparatus, said insert conduit unit comprising:

(a) a pair of insert conduit sections, (b) each conduit section comprising walls connected in spaced parallel relation, and of triangular outline, means for connecting said sections in interlocking registration with the openings in the raceways, and means rotatably connecting said sections to each other.

22. In an insert conduit unit for use in connection with a raceway member as set forth in claim 21, said means so rotatably connecting said sections comprising means passing through side walls of said sections.

23. An insert conduit device for application to axially elongated raceway members having spaced side walls provided with apertures formed therein axially non-aligned, whereby cables and wires may be passed through said raceway member non-aligned apertures and connected to apparatus, said insert conduit device comprising:

(a) a pair of insert device sections, (b) each section having a pair of side wall members and an end wall member connecting the side wall members in spaced parallel relation and defining the bottom and one closed end of said section, (c) each section being open at the other end thereof, (d) a lower end tab depending from the lower end of the end wall member (e) means connecting said sections contiguously with their open ends in oppositely opening position, said connecting means further so connecting said sections relatively adjustably whereby said sections may be positioned in the raceway in alignment with said non-aligned apertures, and said sections may be adjusted to insert the lower end tabs into said raceway apertures and to secure said tab and thereby said sections to said raceway.

24. In an insert conduit device as set forth in claim 23, flanges on said sections extending outwardly angularly therefrom and formed complementarily to said raceway openings, and proportioned to overlap and thus grommet the raceway opening on so positioning the sections in the raceway.

25. In an insert conduit device as set forth in claim 23, flanges on said sections overlying the raceway member on so applying the device to the raceway member.

26. In an insert conduit device as set forth in claim 23, a casing body with means complementary to the insert device sections and proportioned to register therewith to connect said insert device sections and body casing.

27. In an insert conduit device as set forth in claim 26, barrier means in the casing body and depending in alignment with the sections and defining separation means for members entering the casing body member from said sections.

* * * * *